(12) United States Patent
Wesgardh et al.

(10) Patent No.: US 9,850,707 B2
(45) Date of Patent: Dec. 26, 2017

(54) JOINT ELEMENT FOR CABLE LADDER AND A METHOD FOR THE MOUNTING OF THE SAME

(71) Applicant: SCHNEIDER ELECTRIC INDUSTRIES SAS, Rueil-Malmaison (FR)

(72) Inventors: Rolf Wesgardh, Mora (SE); Håkan Bälter, Mora (SE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 235 days.

(21) Appl. No.: 14/378,558

(22) PCT Filed: Feb. 13, 2013

(86) PCT No.: PCT/IB2013/051161
§ 371 (c)(1),
(2) Date: Aug. 13, 2014

(87) PCT Pub. No.: WO2013/128316
PCT Pub. Date: Sep. 6, 2013

(65) Prior Publication Data
US 2015/0074980 A1 Mar. 19, 2015

(30) Foreign Application Priority Data
Feb. 14, 2012 (SE) ........................ 1250123

(51) Int. Cl.
*E06C 7/50* (2006.01)
*F16B 7/04* (2006.01)
(Continued)

(52) U.S. Cl.
CPC ............. *E06C 7/50* (2013.01); *H02G 3/0456* (2013.01); *H02G 3/0608* (2013.01);
(Continued)

(58) Field of Classification Search
CPC ...... E06C 7/50; H02G 3/0616; H02G 3/0625; H02G 3/0641; H02G 3/0456; F16B 7/0426; Y10T 29/49908; Y10T 29/49826
(Continued)

(56) References Cited

U.S. PATENT DOCUMENTS 2,017,210 A * 10/1935 Kirsch ...................... D03D 1/08
160/173 R
3,126,444 A * 3/1964 Taylor .................. H02G 3/0418
138/163
(Continued)

FOREIGN PATENT DOCUMENTS

CN 201802980 U 4/2011
DE 31 39 287 A1 6/1982
(Continued)

OTHER PUBLICATIONS

JP 2001292517; EPO English Translation; Jun. 24, 2016; pp. 1-5.*

*Primary Examiner* — Christopher Besler
*Assistant Examiner* — Bayan Salone
(74) *Attorney, Agent, or Firm* — Birch, Stewart, Kolasch & Birch, LLP

(57) ABSTRACT

Joint element for joining the side profiles of a first and a second cable ladder end-to-end with each other, preferably the side profiles being of the so-called hexagonal type, which joint element comprises on one hand a longitudinal gripping edge, which is connectable over the first longitudinal edges of the side profiles, and on the other hand a locking edge, which connects to the second, oppositely situated longitudinal edges of the side profiles, the locking edge of the joint element being provided with locking means for the fixation of the joint element against the side profile, wherein the locking means is formed as a locking tab that is formed with a free end and integrated with the locking edge. The invention also concerns a method for joining the side (Continued)

profiles of a first and a second cable ladder end-to-end with each other using such a joint element.

19 Claims, 3 Drawing Sheets

(51) Int. Cl.
    *H02G 3/04*        (2006.01)
    *H02G 3/06*        (2006.01)

(52) U.S. Cl.
    CPC ....... *F16B 7/0426* (2013.01); *Y10T 29/49826* (2015.01); *Y10T 29/49908* (2015.01)

(58) Field of Classification Search
    USPC .................. 29/505, 506, 509; 182/217, 219, 182/178–178.3, 230
    See application file for complete search history.

(56) References Cited

U.S. PATENT DOCUMENTS

| | | | | |
|---|---|---|---|---|
| 3,522,933 | A * | 8/1970 | Braun | E04F 11/181 256/22 |
| 3,900,269 | A * | 8/1975 | Pavlot | F16B 7/0413 403/292 |
| 3,970,170 | A * | 7/1976 | Darling | E06C 7/50 182/103 |
| 4,305,677 | A * | 12/1981 | Kowalski | F16B 7/04 403/205 |
| 4,641,989 | A * | 2/1987 | Maddi | F16B 7/0426 403/118 |
| 4,766,407 | A * | 8/1988 | Grimes | H01F 41/0206 336/196 |
| 5,332,866 | A * | 7/1994 | Sawamura | H02G 3/0608 138/166 |
| 5,359,143 | A * | 10/1994 | Simon | H02G 3/0608 138/157 |
| 5,376,423 | A * | 12/1994 | Wiegand | F16B 7/0426 24/289 |
| 5,663,527 | A * | 9/1997 | Hui | H02G 3/263 174/101 |
| 5,753,855 | A * | 5/1998 | Nicoli | H02G 3/0608 138/157 |
| 6,000,187 | A * | 12/1999 | Shimizu | F16L 3/26 248/49 |
| 6,756,539 | B1 * | 6/2004 | VanderVelde | H02G 3/045 138/162 |
| 7,307,217 | B2 * | 12/2007 | Daito | H02G 3/0418 138/157 |
| 8,136,769 | B2 * | 3/2012 | Cardin | F16L 3/26 248/49 |
| 9,024,188 | B2 * | 5/2015 | Lacey, Jr. | H02G 3/0437 174/68.3 |
| 9,209,609 | B2 * | 12/2015 | Kellerman | H02G 3/0608 |
| 2005/0274571 | A1 * | 12/2005 | Simpson | E06C 1/18 182/23 |
| 2006/0169849 | A1 | 8/2006 | Saavedra | |
| 2010/0086348 | A1 * | 4/2010 | Funahashi | H02G 3/0456 403/306 |
| 2011/0000393 | A1 * | 1/2011 | Gramatte | E01B 25/24 104/91 |
| 2011/0290523 | A1 * | 12/2011 | Lacey, Jr. | H02G 3/0437 174/68.3 |

FOREIGN PATENT DOCUMENTS

| | | | | |
|---|---|---|---|---|
| DE | | 3139287 A1 * | 6/1982 | .......... H02G 3/0608 |
| EP | | 0 083 809 A1 | 7/1983 | |
| FR | | 2 686 141 A1 | 7/1993 | |
| JP | | 2001292517 A * | 10/2001 | |

* cited by examiner

JOINT ELEMENT FOR CABLE LADDER AND A METHOD FOR THE MOUNTING OF THE SAME

TECHNICAL FIELD

The present invention relates to a device for joining a cable ladder.

BACKGROUND OF THE INVENTION

Joint devices for cable ladders having a hexagon profile are previously available in the form of joint elements that are hooked over one edge of the profile and are turned over around the opposite edge of the profile. These joint devices are provided with locking screws that are adjustable from the outside of the joint element and lock the joint element against said opposite edge. Said previously known joint elements are called ladder joints and are available in different surface treated finishes.

Thus, these joint elements require, on one hand, that the screws are screwed sufficiently far into the element to be kept in place upon transportation, but not so far screwed-in that the joint element cannot be hooked up onto the hexagon profile without the screws impeding this. Should the screws be screwed-in too far into the profile, this would mean that a fitter first has to unscrew the screws and then again screw in the same into abutment against the hexagon profile. Furthermore, said previously known joint elements require that the fitter has to fit in a tool against a screw head and then turn/rotate the same for a fastening.

THE OBJECT OF THE INVENTION

The object of the invention is to provide a joint element that can be mounted faster than previously known joint elements.

The object is furthermore to provide a joint element that does not require loose parts of the joint element to be mountable.

The object is furthermore to provide a method for joining a first one and a second one of the side profiles of a cable ladder end-to-end with each other using such a joint element.

The object of the new joint element as well as the new method is that a joining of the side profiles of a cable ladder should on one hand be time-saving and on the other hand require simpler tools as well as cause fewer mounting problems, such as missing mounting details.

SUMMARY OF THE INVENTION

By the present invention, as the same appears in the independent claims, the above-mentioned objects are met, said disadvantages having been eliminated. Suitable embodiments of the invention are defined in the dependent claims.

The invention concerns a joint element for joining a first one and a second one of the side profiles of a cable ladder end-to-end with each other. The side profiles of the cable ladder are preferably of so-called hexagonal type, but may assume other cross-sectional shapes, for instance a square type such as a parallelogram or rhomb. Joint elements comprise on one hand a longitudinal gripping edge, which is connectable over the first longitudinal edges of the side profiles, and on the other hand a locking edge, which connects to the second, oppositely situated longitudinal edges of the side profiles. The fact that said longitudinal edges are opposite should be interpreted as the edges have the capability of retaining a joint element provided with a web only on one side of the side profile. The locking edge of the joint element is provided with locking means for the fixation of the joint element against the side profile. In addition, the locking means is formed as a locking tab that is formed with a free end and integrated with the locking edge. The fact that this locking tab is integrated with the locking edge involves that the locking tab can be punched into, can be welded/soldered, or be riveted to the joint element. Such a design implies that there are no loose parts of the joint element and that the same either can be attached by snap action around the side profiles that are provided with elastic resilient locking tabs without any tool at all, or by plastically deformable locking tabs that are deformed by means of a tool, for instance a screwdriver.

In one embodiment of the invention, the locking tab with the free end is, in a rest position, deformed to be angled inward toward the joint element. This embodiment is preferably provided with an elastically resilient locking tab.

In one embodiment of the invention, the locking tab is elastically deformable from its rest position. This embodiment is preferably provided with a plastically deformable locking tab.

In one embodiment of the invention, the locking tab is plastically deformable. This embodiment is easy to manufacture, and in the original position, the locking tab is entirely flush with the rest of the joint element, i.e., that the locking tab does not project in any direction.

In one embodiment of the invention, the locking tab is penetratingly arranged in the locking edge, for instance formed by punching of the locking edge.

In one embodiment of the invention, the free end of the locking tab, when the joint element is mounted, has been brought into locking against at least one side profile, preferably by abutment. A certain stiffness of the joint between two side profiles is obtained even if the free end of the locking tab does not abut against the side profiles, but the best coupling joint is obtained if the free end of the locking tab abuts against and also abuts by a certain force against the side profiles.

In one embodiment of the invention, the joint element is provided with at least two tabs, the free end of at least one locking tab of which locks the first side profile and the free end of at least one locking tab locks the second side profile, where the locking preferably is effected by abutment. Thus, at least one locking tab acts against each side profile. Within the scope of this embodiment, more than one locking tab may also act against one or both side profiles. This means an increased mounting force of the joint element and results in increased stiffness of the coupling joint.

In one embodiment of the invention, the joint element is provided with at least one point or one jag on its free end. This point or jag aims at preventing sliding of the joint element along the profile in vertical installations.

The invention also concerns a method for joining a first one and a second one of the side profiles of a cable ladder end-to-end with each other using a joint element. In doing so, a first side profile and a second side profile are laid against each other end-to-end, a gripping edge of the joint element being laid over the first longitudinal edges of the side profiles across the formed joint and the two ends abutting against each other. The joint element is then turned around the two ends abutting against each other in such a way that a locking edge of the joint element connects to the second longitudinal edges of the side profiles. The free end of at least one locking tab of the joint element is brought into locking against at least one of the side profiles, preferably by abutment. The method represents a simple, quick, and problem-free joining of a cable ladder.

In one embodiment of the invention, the free end of the locking tab is snapped around the side profile by being elastically deformable.

In one embodiment of the invention, the free end of the locking tab is deformed against the side profile by being plastically deformable.

A joint element according to the invention may also be used in providing branches and vertical bends of cable ladders. Also, joint elements according to the invention may be used in horizontal and vertical anglings of cable ladders.

BRIEF DESCRIPTION OF THE DRAWINGS

Now, the invention will be described in more detail with references in connection with the accompanying drawing figures.

DESCRIPTION OF THE INVENTION

Figure 1:
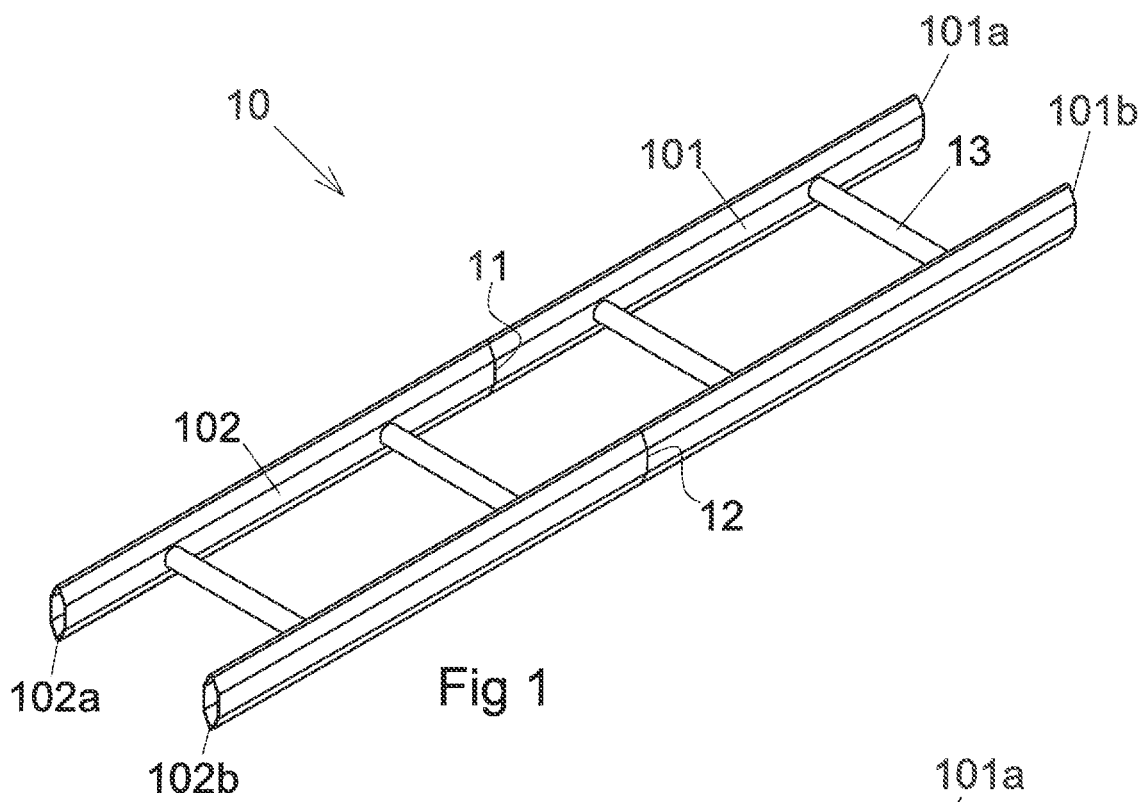
FIG. 1 shows a perspective view of a joint in a conventional cable ladder of hexagonal type.

FIG. 1 shows a first cable ladder 101 the side profiles 101a, 101b of which are laid end-to-end against the side profiles 102a, 102b of a second cable ladder 102 for allowing the first and second cable ladder 101, 102 to be joined into a uniform cable ladder 10. Preferably, the joints 11, 12 of the side profiles are placed opposite each other on the cable ladder 10. All side profiles are of the same design, which consists of the so-called hexagonal type. The side profiles are united at a constant distance from each other by ladder rungs 13, which may be, for instance, oval moulded or plane perforated.

Figure 2:
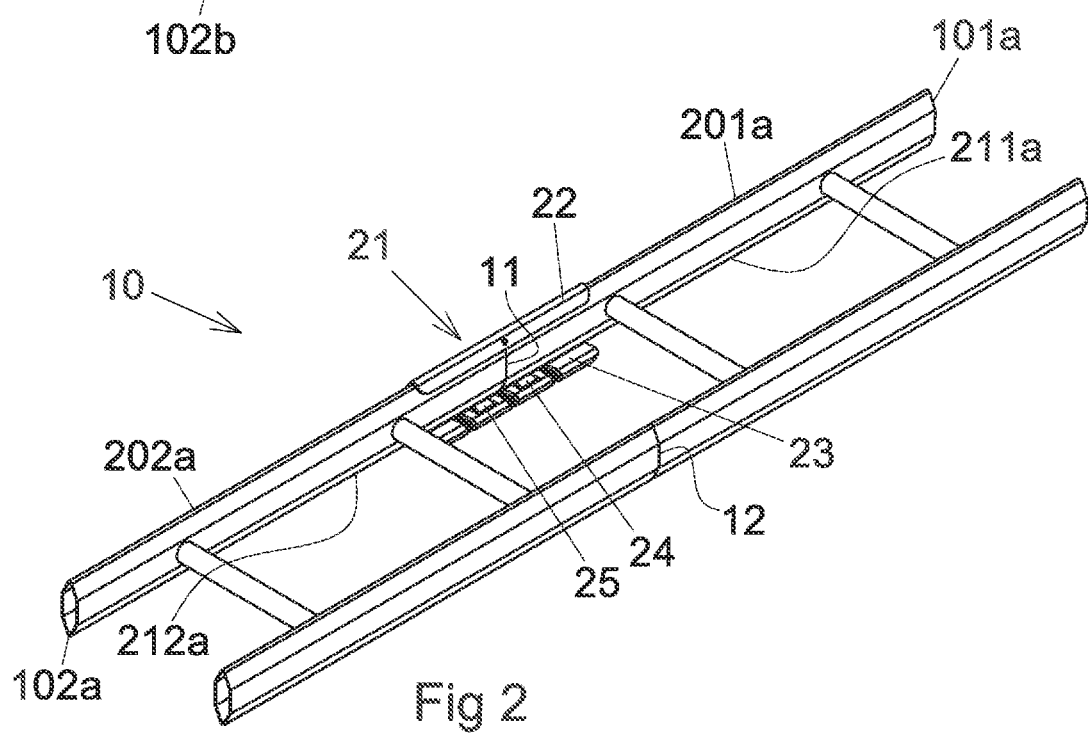
FIG. 2 shows a perspective view of a joint element according to one embodiment of the invention.

FIG. 2 shows the two joints 11, 12 of the cable ladder 10, the first joint 11 of which has been provided with a joint element 21 according to the invention. The joint element has been mounted over the joint 11 by a longitudinal gripping edge 22 of the joint element 21 having been hooked over the first longitudinal edges 201a, 202a of the side profiles 101a, 102a in the area of the joint 11. The joint element 21 is furthermore provided with a locking edge 23, which connects to the second, oppositely situated longitudinal edges 211a, 212a of the side profiles 101a, 102a. The locking edge 23 of the joint element 21 is provided with locking means 24, 25 for the fixation of the joint element 21 against the outer surfaces of the side profiles 101a, 102a facing inward toward the cable ladder 10.

Figure 3:
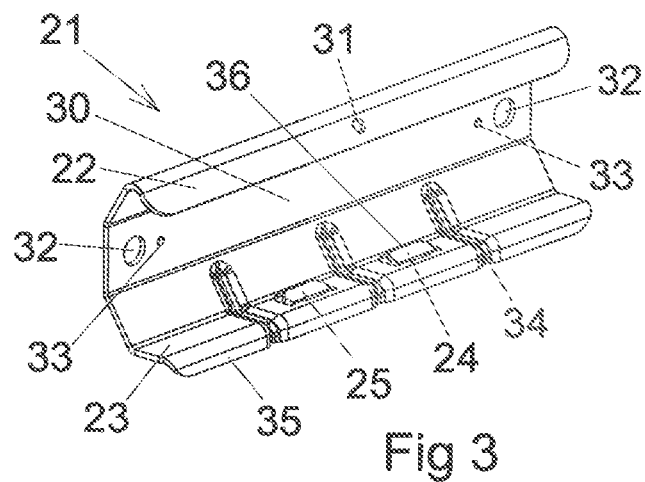
FIG. 3 shows a perspective view in more detail of the joint element according to FIG. 2.
Figure 4:
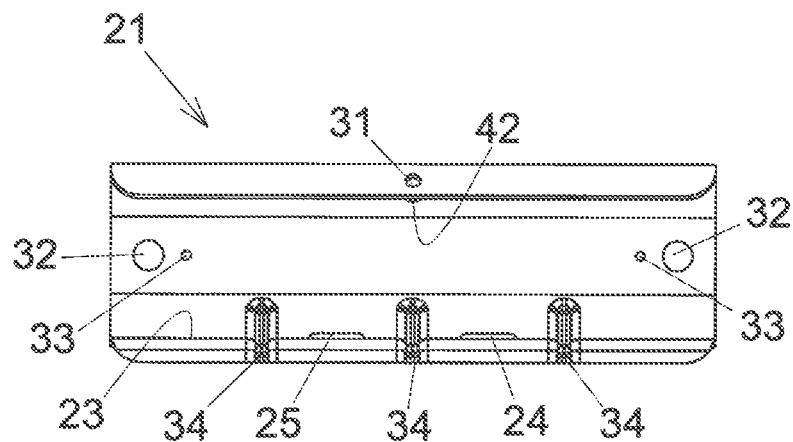
FIG. 4 shows a front view of the joint element according to FIG. 3.

FIG. 3 shows only the joint element 21 in perspective, the figure being provided with construction lines to make clear bendings of the joint element. The gripping edge 22 of the joint element is connected to the locking edge 23 of the joint element by an arc-shaped or bent web 30. The gripping edge 22 is provided with a first inspection hole 31 through which the joint between the two cable ladders can be observed when the joint element is correctly mounted. A second inspection hole 42, see FIG. 4, is arranged on the other side of the gripping edge with the same purpose, i.e., to observe the joint between the two cable ladders upon mounting. The web 30 of the joint element is provided with holes 32 for tool guiding and earthing holes 33. In these earthing holes 33, earth screws are mounted, not shown, which provide electrical contact between the joint element and the respective side profile. The earthing by earth screws is used when the cable ladder and the joint thereof is treated with a non-conducting surface treatment, such as powder coating or the like. In case of a metallic surface treatment, for instance hot dip galvanizing, no extra such earthing is needed at the joint but the general earthing of the cable ladder is sufficient. In both these cases of earthing, the joint will comply with the requirements for equipotential bonding according to the International Standard IEC 61537 for systems of cable trays and cable ladders.

The joint element 21 is provided with three first stiffening means 34 in the form of grooves pressed down into the joint element. The joint element is furthermore provided with second stiffening means 35 in the form of the free end of the locking edge 23 being bent along the entire locking edge at an angle of approximately 90° downward in the direction away from the gripping edge 22.

In the embodiment illustrated, the locking edge 23 is provided with two locking means 24, 25, each of which is formed as a locking tab that is formed with a free end 36 and integrated with the locking edge by being punched directly out of the locking edge. The free end of the locking tab is directed inward toward the web 30 of the joint element and is in a rest position displaced upward from the surface of the locking edge 23.

FIG. 4 shows the first inspection hole 31 and the second inspection hole 42 in the joint element 21 through which inspection hole 31, 42 a fitter can observe the joint in question when the joint element is correctly mounted. The figure also shows the two holes for the tool guiding as well as the earthing holes 33. The embodiment according to the figure is provided with two locking means 24, 25, both of which are bent so that they are visible above the surface of the locking edge 23. The two locking means are flanked by the first stiffening means 34, which in this embodiment are three in number, the middle one of which is situated at the position of the joint between the side profiles in order to reinforce the joint element exactly where the joint is situated.

Figure 5:
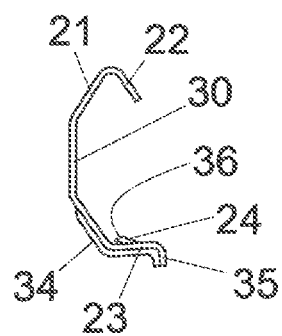
FIG. 5 shows an end view of the joint element according to FIG. 4.

FIG. 5 shows the joint element 21 from the end with the gripping edge 22 and the locking edge 23 interconnected by the web 30, which, when the joint element is mounted, extends externally around the side profiles of the cable ladder. The figure shows the locking means 24 with its free end 36. In addition, the figure shows the first stiffening means 34 and the second stiffening means 35. Accordingly, the joint element 21 is essentially formed with a C-shape and is hooked over the side profiles and fixed around the side profiles using the locking means 24.

Figure 6:
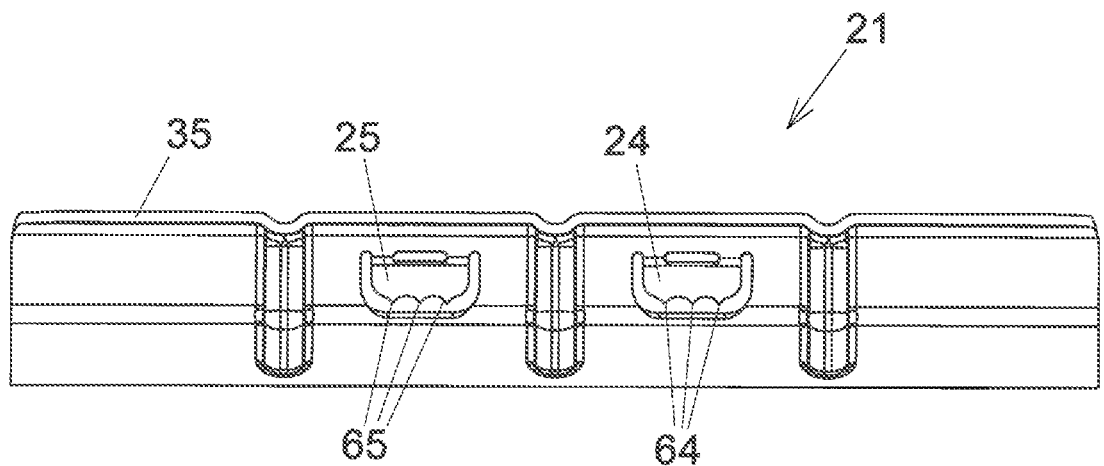
FIG. 6 shows a bottom view of the joint element according to FIG. 4.

FIG. 6 shows the joint element 21 from the underside, the edge of the second stiffening means 35 being bent for the purpose of reinforcement. The figure shows the locking means 24, 25 that are a slightly bent inward toward the joint element 21, and each one of which locking elements is provided with points or jags 64, 65 on its free end, which jags, in the embodiment illustrated, are three in number of each locking means. The jags aim at preventing the joint element from sliding along the side profile in a vertical installation.

Figure 7:
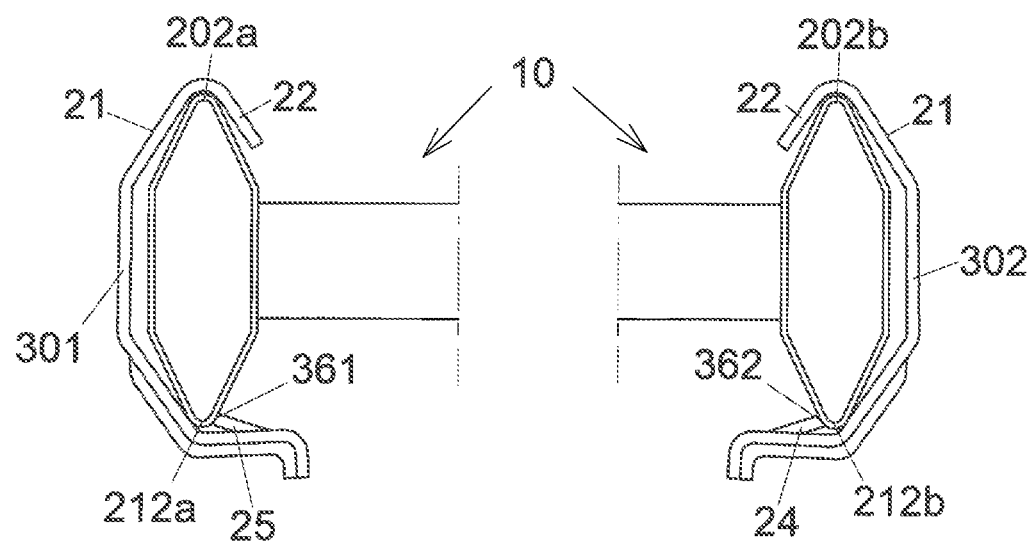
FIG. 7 shows an end view of two joint elements according to the invention mounted to join a cable ladder.

FIG. 7 shows an end view of a cable ladder 10 that has been joined using joint elements according to the shown embodiment. The cable ladder has been cut off according to the dash-dotted lines so that the two sides thereof can be shown beside each other. In the area of the joint, the gripping edges 22 of the joint elements 21 have been hooked up around the longitudinal edges 202a, 202b of the side profiles, the joint elements having been turned around the opposite longitudinal edges 212a, 212b of the side profiles into abutment against the side profiles.

In the embodiment illustrated according to FIGS. 3-6, the locking means 24, 25 are elastically formed so that the joint elements 21 are snapped onto the side profiles. In other embodiments, the locking means are plastically formed, the locking means being deformed into the situation shown in FIG. 6. In the embodiment of the plastically formed locking means, a tool is used to deform the same into abutment according to FIG. 6.

Irrespective of which of these embodiments of the locking means that is used, an abutment will occur between the free ends 361, 362 of the locking means 24, 25 and the outer surfaces of the side profiles in the area of the opposite longitudinal edges 212a, 212b. In this connection, the jags of the locking means abut against the outer surface of the side profiles in order to eliminate sliding. Simultaneously, also the lowermost part of the web 301, 302 of the joint elements will abut against the outer surfaces of the side profiles in the area of the opposite longitudinal edges 212a, 212b.

Designs according to embodiments according to the invention will be as strong as conventional joint elements that are locked to the side profiles by a screw joint. Furthermore, the material properties of the locking means will be such that the locking means complies with the requirements of mounting and dismounting according to the previously mentioned standard.

The invention claimed is:

1. A joint element for joining side profiles of a first and a second cable ladder end-to-end with each other, the side profiles having a hexagonal cross section, each side profile having a first longitudinal edge and a second longitudinal edge located opposite to the first longitudinal edge, the joint element comprises:
   a longitudinal gripping edge; and
   a locking edge,
   wherein the locking edge connects to the second longitudinal edges of the side profiles,
   wherein the locking edge is provided with at least one locking tab extending therefrom for fixation of the joint element against the side profile, the at least one locking tab is spaced from an end of the locking edge,
   wherein the longitudinal gripping edge connects to the first longitudinal edges of the side profiles,
   wherein the at least one locking tab is formed with a free end,
   wherein when the joint element is mounted, the at least one locking tab provides an abutment of the free end against outer surfaces of the side profiles at the second longitudinal edges, and
   wherein the cross section of the joint element corresponds to the cross section of the side profiles.

2. The joint element according to claim 1, wherein the locking tab, with the free end is, in a rest position, deformed to be angled inward toward the joint element.

3. The joint element according to claim 2, wherein the locking tab is elastically deformable from its rest position.

4. The joint element according to claim 1, wherein the locking tab is plastically deformable.

5. The joint element according to claim 1, wherein the locking tab is penetratingly arranged in the locking edge, for instance formed by punching of the locking edge.

6. The joint element according to claim 1, wherein the joint element is provided with at least two tabs, the free end of at least one locking tab of which locks the first side profile and the free end of at least one locking tab locks the second side profile, where the locking is effected by abutment.

7. The joint element according to claim 1, wherein the joint element is provided with at least one point or one jag on its free end.

8. A method for joining first and second side profiles of first and second cable ladders, respectively, end-to-end with each other using a joint element, the side profiles having a hexagonal cross section, each side profile having a first longitudinal edge and a second longitudinal edge located opposite to the first longitudinal edge, the method comprising:
   positioning the first side profile and the second side profile against each other end-to-end to form a joint;
   positioning a gripping edge of the joint element over the first longitudinal edge of the first and second side profiles across the joint and across the two ends of the side profiles abutting against each other; and
   turning the joint element around the joint such that a locking edge of the joint element connects to the second longitudinal edge of the first and second side profiles,
   wherein a free end of at least one locking tab of the locking edge abuts against at least one second longitudinal edge, the at least one locking tab is spaced from an end of the locking edge, and
   wherein the cross section of the joint element corresponds to the cross section of the side profiles.

9. The method according to claim 8, wherein the free end of the locking tab is snapped around the side profile by being elastically deformable.

10. The method according to claim 8, wherein the free end of the locking tab is deformed against the side profile by being plastically deformable.

11. The joint element according to claim 2, wherein the locking tab is penetratingly arranged in the locking edge, for instance formed by punching of the locking edge.

12. The joint element according to claim 3, wherein the locking tab is penetratingly arranged in the locking edge, for instance formed by punching of the locking edge.

13. The joint element according to claim 4, wherein the locking tab is penetratingly arranged in the locking edge, for instance formed by punching of the locking edge.

14. The joint element according to claim 2, wherein the free end of the locking tab, when the joint element is mounted, has been brought into locking against at least one side profile by abutment.

15. The joint element according to claim 3, wherein the free end of the locking tab, when the joint element is mounted, has been brought into locking against at least one side profile by abutment.

16. The joint element according to claim 4, wherein the free end of the locking tab, when the joint element is mounted, has been brought into locking against at least one side profile by abutment.

17. The joint element according to claim 5, wherein the free end of the locking tab, when the joint element is mounted, has been brought into locking against at least one side profile by abutment.

18. The joint element according to claim 2, wherein the joint element is provided with at least two tabs, the free end of at least one locking tab of which locks the first side profile and the free end of at least one locking tab locks the second side profile, where the locking is effected by abutment.

19. The joint element according to claim 3, wherein the joint element is provided with at least two tabs, the free end of at least one locking tab of which locks the first side profile and the free end of at least one locking tab locks the second side profile, where the locking is effected by abutment.

* * * * *